US008873637B2

(12) United States Patent
Isani et al.

(10) Patent No.: US 8,873,637 B2
(45) Date of Patent: Oct. 28, 2014

(54) HARDWARE PIXEL PROCESSING PIPELINE AND VIDEO PROCESSING INSTRUCTIONS

(75) Inventors: Tarik Isani, San Jose, CA (US); Zao Yang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 12/838,499

(22) Filed: Jul. 19, 2010

(65) Prior Publication Data

US 2011/0280315 A1 Nov. 17, 2011

Related U.S. Application Data

(60) Provisional application No. 61/345,041, filed on May 14, 2010, provisional application No. 61/353,191, filed on Jun. 9, 2010.

(51) Int. Cl.

| H04N 7/12 | (2006.01) |
|---|---|
| H04N 19/59 | (2014.01) |
| H04N 19/184 | (2014.01) |
| G06F 9/30 | (2006.01) |
| H04N 19/44 | (2014.01) |
| H04N 19/436 | (2014.01) |
| G06F 9/38 | (2006.01) |
| H04N 19/132 | (2014.01) |
| H04N 19/85 | (2014.01) |

(52) U.S. Cl.
CPC ... *H04N 19/00757* (2013.01); *H04N 19/00309* (2013.01); *G06F 9/3001* (2013.01); *H04N 19/00533* (2013.01); *H04N 19/00521* (2013.01); *G06F 9/30025* (2013.01); *G06F 9/3887* (2013.01); *H04N 19/00127* (2013.01); *H04N 19/00903* (2013.01)
USPC .............. 375/240.25; 375/E7.027; 375/240.2

(58) Field of Classification Search
CPC . G06F 9/3001; G06F 9/30025; G06F 9/3887; H04N 19/00127; H04N 19/00309; H04N 19/00521; H04N 19/00533; H04N 19/00757; H04N 19/00903
USPC .............. 375/240.01–240.29, E7.027, 240.2, 375/240.25
See application file for complete search history.

(56) References Cited

U.S. PATENT DOCUMENTS

| 5,450,098 | A | * | 9/1995 | Oz ................................ 345/605 |
| 5,528,513 | A | | 6/1996 | Vaitzblit et al. |
| 5,805,227 | A | * | 9/1998 | Gi-Hwan ................. 375/240.17 |

(Continued)

OTHER PUBLICATIONS

Mische J., et al., "IPC Control for Multiple Real-Time Threads on an In-Order SMT Processor", HiPEAC 2009, pp. 125-139 Published: Jan. 2009.

(Continued)

*Primary Examiner* — Christopher S Kelley
*Assistant Examiner* — Asmamaw G Tarko
(74) *Attorney, Agent, or Firm* — Peter Michael Kamarchik; Nicholas J. Pauley; Joseph Agusta (57) ABSTRACT

A hardware pixel processing pipeline and a video processing instruction set accelerate image processing and/or video decompression. The pixel processing pipeline uses hardware components to more efficiently perform color space conversion and horizontal upscaling. Additionally, the pixel processing pipeline also reduces the size of its output data to conserve bandwidth. A specialized video processing instruction set allows further acceleration of video processing or video decoding by allowing receipt of a single instruction to cause multiple addition operation or interpolation of multiple pairs of pixels in parallel.

25 Claims, 2 Drawing Sheets

(56) References Cited

U.S. PATENT DOCUMENTS

| | | |
|---|---|---|
| 5,928,322 A | 7/1999 | Bitar et al. |
| 6,317,774 B1 | 11/2001 | Jones et al. |
| 7,747,097 B2 * | 6/2010 | van Baarsen et al. ......... 382/248 |
| 2002/0002667 A1 | 1/2002 | Kelsey et al. |
| 2005/0184993 A1 * | 8/2005 | Ludwin et al. ................ 345/502 |
| 2006/0165181 A1 * | 7/2006 | Kwan et al. .............. 375/240.24 |
| 2007/0074216 A1 | 3/2007 | Adachi et al. |
| 2007/0294245 A1 * | 12/2007 | van Baarsen et al. ............. 707/6 |
| 2011/0276979 A1 | 11/2011 | Isani |

OTHER PUBLICATIONS

The Ubicom IP3023TM Wireless Network Processor: A Next-Generation Packet Processor for Wireless Networking Ubicom Published: 2003.

* cited by examiner

HARDWARE PIXEL PROCESSING PIPELINE AND VIDEO PROCESSING INSTRUCTIONS

CROSS-REFERENCE TO RELATED APPLICATIONS

This application claims priority from U.S. Provisional Patent Application No. 61/345,041, filed on May 14, 2010, and from U.S. Provisional Patent Application No. 61/353,191, filed on Jun. 9, 2010, which are incorporated by reference herein in their entirety.

FIELD OF THE INVENTION

The present invention relates to video processing, and more particularly to hardware and specialized video processing instructions accelerating video decompression and/or display.

BACKGROUND OF THE INVENTION

Techniques for video compression and audio compression have increased the amount of video data that can be included in a storage device and simplified transmission of video data through a network, making video data increasingly accessible. Many video compression techniques remove a significant amount of video data while maintaining picture quality by using lossy video compression. Often, video compression techniques compare groups of neighboring pixels from one video frame to the next and transmit the differences between frames, rather each complete frame, while applying a discrete cosine transform to reduce spatial redundancy in the transmitted differences.

Because of common compression techniques, to display compressed video, an inverse cosine transform is applied to received compressed data and the received compressed data is used to generate multiple frames. However, these actions are computationally intensive and typically involve repeated execution of similar instructions to decode various groups of pixels in received data. Additionally, many conventional methods for video decoding rely on software, such as a codec, executing on a general purpose processor or graphics processor, introducing additional computation overhead for software configuration and maintenance. Hence, efficient use of hardware resources for video decompression allows for more efficient video decompression.

SUMMARY OF THE INVENTION

Embodiments of the present invention include a hardware pixel processing pipeline and a video processing instruction set to accelerate image processing and/or video decompression. The hardware pixel processing pipeline includes a color space converter (CSC) which receives video frame data in a first format, such as a YCbCr format, and converts the video data to a second format, such as RGB format. The CSC is coupled to a horizontal upscaler that uses linear interpolation to increase the number of output horizontal pixels by up to a factor of two. In one embodiment, the horizontal upscaler receives RGB data from the CSC and separately upscales each of the R, G and B components to obtain additional data for positions in a frame that do not correspond to positions for which data is included in the RGB data. The output of the horizontal upscaler is coupled to a reduction module which reduces the size of the output data. For example, the output of the horizontal upscaler comprises eight bits of red component data, eight bits of green component data and eight bits of blue component data. Through truncation or rounding, the reduction module generates output comprising five bits of red component data, six bits of green component data and five bits of blue component data, to conserve bandwidth.

A system including the pixel processing pipeline may also use a specialized video processing instruction set to reduce the number of instructions used for image processing or video decompression. In one embodiment, instructions optimized for image processing or video decompression are used in conjunction with a pixel processing pipeline to further accelerate video processing. For example, parallel horizontal and/or parallel vertical interpolation instructions may accelerate interpolation of data for additional frames based on stored reference frames by performing multiple interpolations between multiple pairs of pixels in parallel. In one embodiment, a parallel vertical interpolation instruction receives a first operand identifying four bytes of data and a second operand identifying four bytes of data then performs four linear interpolations between four pairs of bytes in parallel and a parallel horizontal interpolation instruction may similarly perform multiple linear interpolations in parallel based on received bytes of data. A parallel addition instruction may be used to perform parallel additions of multiple pixels. For example, the parallel addition instruction may perform two additions in parallel to add a first 8-bit unsigned number to a first 9-bit signed number and to add a second 8-bit signed number to a second 9-bit signed number to product two output bytes. Instructions may also accelerate image processing by the pixel processing pipeline by blending multiple pixels together in parallel or by reducing the data used to describe various pixel components, conserving system bandwidth.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A preferred embodiment of the present invention is now described with reference to the Figures, where like reference numbers indicate identical or functionally similar elements. Also in the Figures, the left most digit of each reference number correspond to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Example System Architecture

Figure 1:
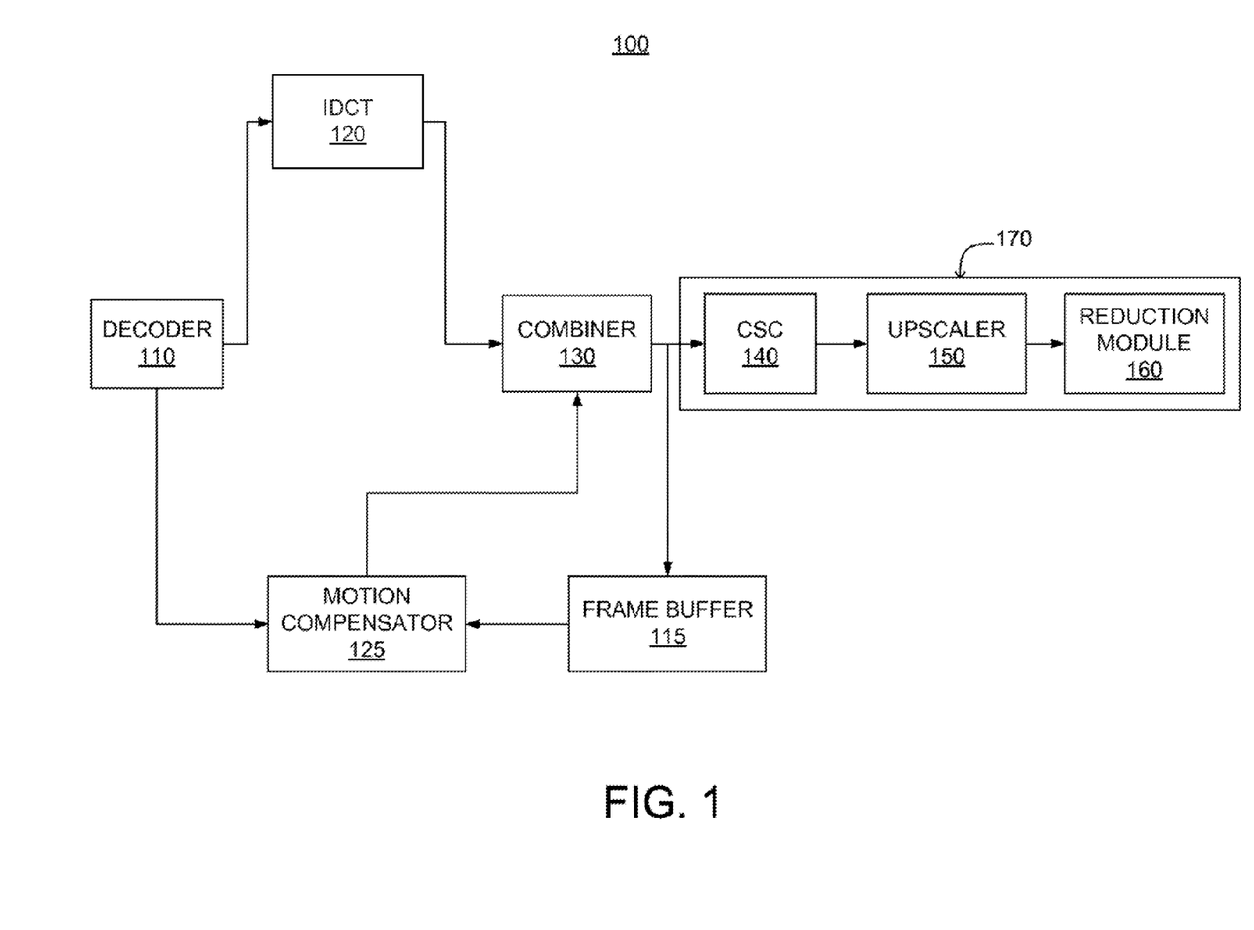
FIG. 1 is a block diagram of a system including a pixel processing pipeline according to one embodiment of the present invention.

FIG. 1 is a block diagram of a video processing system 100 according to one embodiment of the present invention. In the embodiment illustrated by FIG. 1, the video processing system 100 includes a decoder 110, an inverse discrete cosine transform (IDCT) module 120, a frame buffer 115, a motion compensator 125, a combiner 130 and a pixel processing pipeline 170. In the embodiment shown by FIG. 1, the pixel processing pipeline 170 includes a color space converter (CSC) 140, an upscaler 150 and a reduction module 160. However, in other embodiments, the video processing system 100 may include additional components than those shown in FIG. 1. In an embodiment, the components of the video processing system 100 are included in an embedded processor.

For purposes of illustration, the example video processing system 100 shown in FIG. 1 is described as processing compressed video, such as MPEG or MJPEG data, received from a source. A decoder 110, such as a variable length decoder, receives the compressed video from the source and identifies discrete cosine transform (DCT) coefficients from the compressed video. The identified DCT coefficients are communicated to an IDCT module 120 which applies an inverse cosine transform using the identified DCT coefficients to the decoded data. Hence, the IDCT module 120 converts data from the decoder 110 into the spatial domain from the frequency domain.

Figure 2:
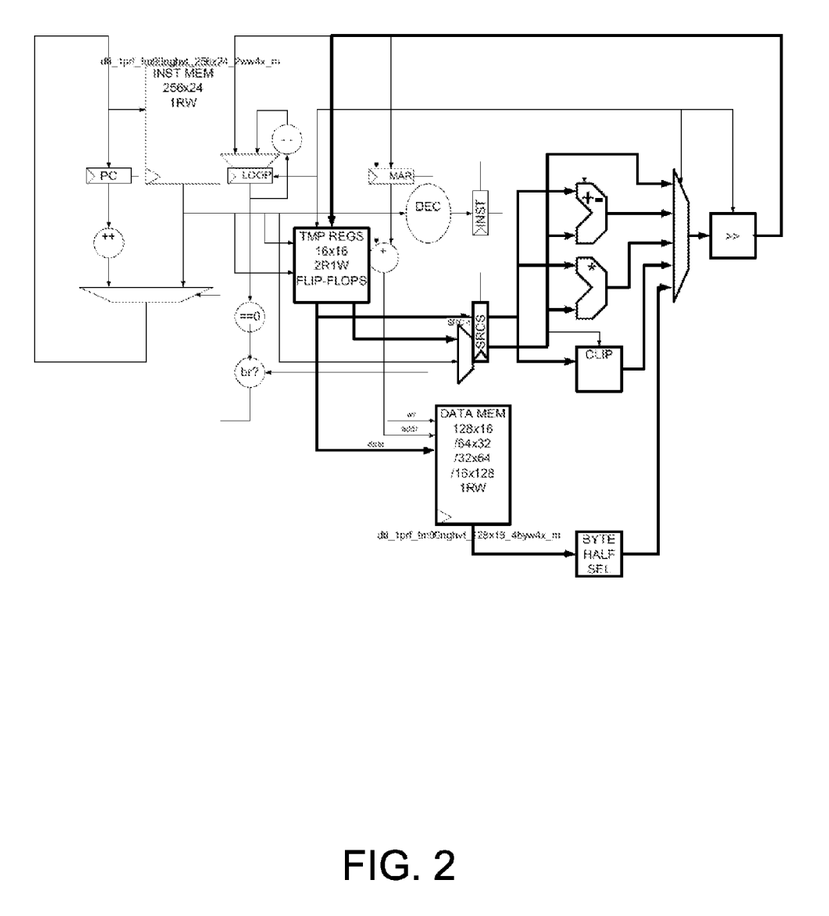
FIG. 2 is a block diagram of an inverse discrete cosine transform module according to one embodiment of the present invention.

The IDCT module 120 is a hardware peripheral coupled to a processor including the remaining components shown by FIG. 1. In one embodiment, the IDCT module 120 is a 32-bit micro digital signal processor (DSP) having a two-stage pipeline and an issue-width of four single-instruction, multiple-data (SIMD) instructions per cycle. FIG. 2 illustrates an example architecture of an IDCT module 120. The IDCT module 120 executes a restricted set of scalar operations and a small set of vector math instructions. In one embodiment, the scalar operations each occupy an issue cycle. Additionally, the IDCT module 120 includes a 256-entry by 26-bit wide instruction memory and a 32-entry by 64-bit wide data memory including 16-bit values for each of the four issue slots for SIMD instructions. Further, each datapath within the IDCT module 120 has sixteen 32-bit registers to hold temporary data during computations. Because the IDCT module 120 is a discrete hardware component separate from a main processor including other components of the video processing system 100, the IDCT module 120 allows mathematically intensive calculations, such as an inverse discrete cosine transform, to be offloaded form the main processor. Although the IDCT module 120 is described herein as executing an inverse discrete cosine transform, in other embodiments the IDCT module 120 may be configured to implement different functions.

Additionally, the IDCT module 120 may communicate an interrupt signal back to a main processor, including the other video processing system 100 components shown in FIG. 1, based on an internal software control. The interrupt signal may indicate completion of inverse discrete cosine transform calculation. For example, the interrupt signal may be communicated to the main processor when the IDCT module 120 finishes processing an 8×8 block of pixels. Hence, controlling software operating on a processor including other video processing system 100 components does not need to poll the IDCT module 120 to determine completion of the inverse cosine transform.

A frame buffer 115 comprises a computer readable storage medium, or another suitable storage device, that stores reference frames used to decompress video data received by the decoder 110. Reference frames are frames having data associated with each pixel in the reference frame, allowing reproduction of the reference frame based on its content. Storing reference frames in the frame buffer 115 allows the size of additional frames to be reduced by including less data in the additional frames. For example, a frame received after a reference frame stored in the frame buffer 115 may include data describing changes between the received frames and the stored reference frame rather than data describing each pixel in the later-received frame, significantly reducing the data included in subsequently received frames.

A motion compensator 125 is coupled to the frame buffer 115 and to the decoder 110. The motion compensator 125 retrieves one or more reference frames from the frame buffer 115 and also receives motion vectors from the decoder 110 that describe how groups of pixels in a received frame have moved in relation to a reference frame. The motion compensator 125 uses the motion vectors and one or more reference frames received from the frame buffer 115 to interpolate data describing pixels in additional frames that predicts movement of the groups of pixels between frames. In one embodiment, the motion compensator 125 uses specialized video processing instructions, further described below, to expedite this prediction by performing multiple interpolations in parallel.

The combiner 130 reconstructs data describing frames of received video by adding output from the motion compensator 125 to output from the IDCT module 120. The combiner 130 may also use specialized video processing instructions to add multiple pixels from the motion compensator 125 output to multiple pixels from the IDCT module 120 output using a single instruction, as further described below. Output from the combiner 130 may be stored by the frame buffer 130 for storage as a reference frame.

In the embodiment shown by FIG. 1, the pixel processing pipeline 170 receives YCbCr data associated with video or images from the combiner 130. However, in other embodiments the pixel processing pipeline 170 receives data in any format suitable for describing a color space. For example, the pixel processing pipeline 170 receives frame data comprising 32 bit words of YCbCr data, where a portion of the frame data describes luminance information (Y) and other portions of the frame data describe blue-difference (Cb) and red-difference. (Cr) components of frame data. Use of YCbCr allows transmission errors or compression artifacts to be more efficiently masked from human perception. However, use of RGB data having data describing red (R), blue (B) and green (G) components of frames simplifies pixel processing using a color space with additive color composition, as used in display devices such as liquid crystal display (LCD) monitors.

Thus, the color space converter (CSC) 140 included in the pixel processing pipeline 170 converts YCbCr frame data from the combiner 130 into RGB data. In other embodiments, however, the CSC 140 may convert data from the combiner 130 having a first format into a second format. For example, the CSC 140 converts a 32-bit word including YCbCr into a 24 bit word with 8 bits used for the red (R) component, 8 bits used for the green (G) component and 8 bits used for the blue (B) component (a RGB888 word). In one embodiment, the CSC 140 includes a plurality of first-in, first-out (FIFO) queues, or other storage devices, that individually store separate components of data received by the pixel processing pipeline 170. For example, the CSC 140 stores luminance data (Y), blue-difference data (Cb) and red-difference data (Cr) in a luminance FIFO, a blue-difference FIFO and a red-difference FIFO, respectively; this allows the pixel processing pipeline 170 to store frame data until the output data path to which the pixel processing pipeline 170 is coupled has resources for receiving an output pixel from the pixel processing pipeline 170.

In one embodiment, the CSC 140 includes, in a computer-readable storage medium, data describing color space conversion equations for converting YCbCr data, or other formatted input data, into RGB data. The CSC 140 may also include instructions for initially modifying the YCbCr data to expedite color space conversion. For example, the CSC 140 may subtract a value determined by the video range from the luminance data then clip the luminance data to zero. In one embodiment, the CSC 140 uses integer math and the following equations to convert input data from YCbCr to RGB data:

$$R=[CY(Y-VRANGE*16)+CRR(Cr-128)]/256$$

$$G=[CY(Y-VRANGE*16)-CGB(Cb-128)-CGR(Cr-128)]/256$$

$$B=[CY(Y-VRANGE*16)+CBB(Cb-128)]/256.$$

Where:
CY is the Y coefficient and is specified by a nine-bit unsigned integer.
CRR is the Cr coefficient for the red component and is specified by a ten-bit unsigned integer,
CGB is the Cb coefficient for the green component and is specified by a nine-bit unsigned integer,
CGR is the Cr coefficient for the green component and is specified by a nine-bit unsigned integer,
CBB is the Cb coefficient for the blue component and is specified by a ten-bit unsigned integer and
VRANGE is the video range, specifying a vertical range from 0 to 255 or from 16 to 235.

In other embodiments, however, the CSC 140 may use different equations for converting YCbCr data to RGB data.

The RGB data, such as an RGB888 word, produced by the CSC 140 is communicated to a horizontal upscaler 150, which uses linear interpolation to increase the number of horizontal pixels in lines of a frame by up to a factor of two. The horizontal upscaler 150 individually upscales each of the R, G and B components to obtain additional color for positions in an image that do not correspond to received color data. In one embodiment, the horizontal upscaler 150 is initially configured by control data indicating the number of input pixels per line in an input image and indicating the number of output pixels per line in an output image. The ratio between the number of output pixels per line to number of input pixels per line determines how the linear interpolation used by the horizontal upscaler 150 upsamples the input data. Using linear interpolation allows the horizontal upscaler 150 to use RGB data from a first pixel and RGB from a second pixel, such as data from two pixels horizontally adjacent to each other in a line, to identify RGB data for one or more pixels between the first pixel and the second pixel.

To conserve bandwidth, RGB888 data output, or other data output, by the horizontal upscaler 150 is communicated to a reduction module 160 reduces the size of the data output by the horizontal upscaler 150. In one embodiment, the reduction module 160 generates 16-bit data words using 5 bits for the red (R) component, 6 bits for the green (G) component and 5 bits for the blue (B) component (RGB565 words) from 24-bit RGB888 words received from the horizontal upscaler 150. The reduction module 160 may be configured to truncate received RGB888 data or may be configured to round received RGB888 data to generate RGB565 data. In an embodiment, components of the RGB565 data are then communicated to component-specific lookup tables (LUTs) that convert the five or six bits of a component to a color suitable for presentation on a display device and may perform gamma correction or other suitable modification techniques. In one embodiment, a red LUT determines a 32 bit physical color associated with the 5 bit red component from the RGB565 data and a blue LUT determines a 32 bit physical color associated with the 5 bit blue component from the RGB565 data while a green LUT determines a 64 bit physical color associated with the 6 bit green component from the RGB565. The colors identified by the LUTs are then communicated to an output device or stored in an output queue for communication to an output device.

Hence, the video processing system 100 accelerates video processing using the hardware-implemented pixel processing pipeline 170 and may also accelerate video decompression by using video processing specific instructions, further described below, to optimize performance of additional components, such as the combiner 130 or the motion compensator 125.

Video Processing Instruction Set

To further accelerate image processing, an instruction set optimized for video decompression and display, also referred to herein as a "video processing instruction set," is used. In one embodiment, the video processing instruction set includes instructions allowing acceleration of image processing and instructions accelerating decompression of video data, further accelerating the video processing system 100. For example, the video processing instruction set includes instructions for decompressing MPEG, MJPEG and/or additional video data formats. To illustrate use of the video processing instruction set, examples are provided below illustrating application of example instructions from the video processing instruction set to example pixels, such as RGBA32 and RGB16 pixels. In examples where RBGA32 or RGB16 pixels are described, for purposes of illustration RGB component ordering is used where the red component resides at higher-numbered bit locations than the blue component and the green component resides at bit locations numbered lower than the red component and higher than the blue component. However, red and blue components are symmetrically processed by instructions in the video instruction set, also allowing the instructions to be used for processing either RGB-BUR-ordered pixels in various embodiments.

Image Processing Instructions

An instruction in the video processing instruction set converts a 32-bit pixel including RGB and alpha data (RGBA32) to a 16-bit pixel including RGB data (RGB16), reducing the bandwidth of the resulting pixel while allowing accurate display of the colors described by the pixel. Hence, the RGBA32 to RGB16 conversion instruction receives data identifying a 32-bit RGBA pixel and an operation indicator specifying whether to truncate or round data during the conversion process. While, operation of the RGBA32 to RGB16 conversion instruction is described using a 32-bit RGBA pixel where 8 bits are used to describe each of R, G and B data and 8 bits are used to describe an alpha value, which describes blending between images and differs from image to image, in other embodiments a different format may be used.

The 8 bits describing the value for alpha are discarded and the 8 bits describing R data, the 8 bits describing G data and the 8 bits describing B data are initially identified. The R and B data are truncated or rounded from 8 bits to 5 bits while the G data is truncated or rounded from 8 bits to 6 bits. Use of truncation or rounding is determined by the operation indicator. For example, if the operation indicator has a value of "1," rounding is used while if the operation indicator has a value of "0" truncation is used. If the input RGBA32 pixel uses RGB component ordering, where the red component resides higher-numbered bit locations than the blue component and the green component resides at bit locations numbered lower than the red component and higher than the blue component, the alpha data is discarded and the upper 8 bits are identified and rounded or truncated to generate 5 bits of red component data, similarly the lower 8 bits are identified and rounded or truncated to generate 5 bits of blue component data. The remaining 8 bits are rounded or truncated to generate 6 bits of green component data. An output 16-bit RGB (RGB16) pixel is subsequently generated where the highest-numbered bit locations comprise the 5 bits of red component data and the lowest-numbered bit locations comprise the 5 bits of blue component data with the 6 bits of blue component data occupying bit positions numbered between the red component data and the blue component data.

A pixel blending instruction in the video processing instruction set performs parallel linear interpolations between two pairs of 16-bit RGB pixels (RGB16 pixels). The following example description describes an embodiment where RGB16 pixels are configured so that the red component resides higher-numbered bit locations than the blue component and the green component resides at bit locations numbered lower than the red component and higher than the blue component. Hence, the RGB 16 pixels used in the following example include components organized as {R[4:0], G[5:0], B[4:0]}. For illustrative purposes, operation of the parallel interpolation instruction is described with respect to sixteen-bit pixels having 5 bits describing a red component, six bits describing a green component and 5 bits describing a green component, also referred to as RGB565 pixels.

The pixel blending interpolation instruction receives as operands a first RGB565 pixel, a second RGB565 pixel, a third RGB565 pixel, a fourth RGB565 pixel, a first interpolation specifier and a second interpolation specifier. In one embodiment, the first interpolation specifier and the second interpolation specifier comprise an eight-bit first alpha value and an eight-bit second alpha value, specifying the values used for alpha blending of the first and third RGB565 pixels and alpha blending of the second and fourth RGB565 pixels, respectively. The pixel blending instruction produces two interpolated RGB565 pixels as output. In one embodiment a first output pixel is generated by interpolating the first RGB565 pixel and the third RGB565 pixel using the first interpolation specifier and a second output pixel is generated by interpolating the second RGB565 pixel and the fourth RGB565 pixel using the second interpolation specifier. The color components of the first output pixel are generated by individually interpolating the color components of the first RGB565 pixel and the third RGB565 pixel using the first interpolation specifier. Similarly, the color components of the second output pixel are generated by individually interpolating the color components of the second RGB565 pixel and the fourth RGB565 pixel using the second interpolation specifier.

In one embodiment, the interpolation specifiers are truncated to the six most significant bits when interpolating the red and blue components and are truncated to the seven most significant bits when interpolating the green components. Accordingly, the color components of the first output pixel, identified as $R_{output1}$, $G_{output1}$ and $B_{output1}$ are determined from the color components of the first RGB565 pixel, the third RGB565 pixel and the first interpolation specifier, $\alpha_1$, as follows:

$$R_{output1} = [(\alpha_1')R_3 + (64 - \alpha_1')R_1]/64$$

$$G_{output1} = [(\alpha_1'')G_3 + (128 - \alpha_1'')G_1]/128$$

$$B_{output1} = [(\alpha_1')B_3 + (64 - \alpha_1')B_1]/64,$$

where:

$R_1$, $G_1$, $B_1$ are the red, green and blue components, respectively, of the first RGB565 pixel, $\alpha_1'$ is the first interpolation specified truncated to the 6 most significant bits, $\alpha_1''$ is the first interpolation specified truncated to the 7 most significant bits, and $R_3$, $G_3$, $B_3$ are the red, green and blue components, respectively, of the third RGB565 pixel.

Similarly, the color components of the second output pixel, identified as $R_{output2}$, $G_{output2}$ and $B_{output2}$ are determined from the color components of the first RGB565 pixel, the third RGB565 pixel and the second interpolation specifier, $\alpha_2$, as follows:

$$R_{output2} = [(\alpha_2')R_4 + (64 - \alpha_2')R_2]/64$$

$$G_{output2} = [(\alpha_2'')G_4 + (128 - \alpha_2'')G_2]/128$$

$$B_{output2} = [(\alpha_2')B_4 + (64 - \alpha_2')B_2]/64,$$

where:

$R_2$, $G_2$, $B_2$ are the red, green and blue components, respectively, of the second RGB565 pixel, $\alpha_2'$ is the second interpolation specified truncated to the 6 most significant bits, $\alpha_2''$ is the second interpolation specified truncated to the 7 most significant bits, and $R_4$, $G_4$, $B_4$ are the red, green and blue components, respectively, of the fourth RGB565 pixel.

In one embodiment, $R_{output1}$, $G_{output1}$, $B_{output1}$, $R_{output2}$, $G_{output2}$ and $B_{output2}$ are truncated or rounded and the truncated or rounded values used to generate the first output pixel and the second output pixel, respectively. An operation indicator may be received by the parallel interpolation instruction that specified whether to truncate or to round the output color component values. The red, green and blue components of the first output pixel are combined to form the first output pixel of $\{R_{output1}[4:0], G_{output1}[5:0], B_{output1}[4:0]\}$ and the red, green and blue components of the second output pixel are combined to form the second output pixel of $\{R_{output2}[4:0], G_{output2}[5:0], B_{output2}[4:0]\}$. In one embodiment, the first output pixel and the second output pixel are combined into a single output of $\{R_{output1}[4:0], G_{output1}[5:0], B_{output1}[4:0], R_{output2}[4:0], G_{output2}[5:0], B_{output2}[4:0]\}$. The output pixels, or the single output are then stored to a destination, such as a computer-readable storage medium. In one embodiment, a write-allocate mode is used when storing the output pixels to a destination to more efficiently use of storage resources, such as memory.

Decompression Instructions

The video processing instruction set also includes instructions to accelerate decompression of received video data, such as instructions to perform parallel linear interpolations between multiple pairs of data and instructions to add multiple pairs of numbers in parallel. Using a single instruction to initiate parallel operations reduces the number of instructions necessary to interpolate frame data or combine frame data.

To reduce the amount of data used for video, many video compression techniques transmit data fully describing a limited number of frames, commonly identified as "reference frames." Data describing additional frames is predicted from the fully described frames, and data describing additional intermediate frames may be predicted from a first frame and from a second frame. For example, a frame buffer 115 includes a fully described reference frame and a predicted frame occurring later in time than the fully described frame. Data from the fully described reference frame and from the predicted frame is used to predict data, such as pixel values, that comprise one or more intermediate frames occurring after the fully described reference frame and prior to the predicted frame. A parallel horizontal interpolation instruction allows more rapid interpolation of horizontal pixels in a frame occurring after a first frame and before a second frame.

To accelerate interpolation of horizontal pixels, the parallel horizontal interpolation instruction performs four parallel linear interpolations among five 8-bit bytes of data. The parallel horizontal interpolation instruction receives input identifying a first data source, such as a first eight-bit data byte, a second data source, such as a second eight-bit data byte. The parallel horizontal interpolation instruction also receives a three-bit interpolation specifier identifying a type of interpolation, such as linear interpolation using a two-tap filter or another suitable type of interpolation, and identifying the position of a sub-pixel produced by the interpolation relative to the left-most pixel in the source data. The same interpolation specifier is used for each parallel interpolation and provides an interpolation accuracy of ⅛ of a pixel. The interpolation specifier may also include a rounding control bit used during the interpolation process to modify the interpolation result. Further, the parallel horizontal interpolation instruction may also receive data describing how to orient the data sources relative to each other. For example, the parallel horizontal interpolation instruction may receive data indicating that the first data source is to the left of the second data source, or vice versa. Four interpolation output bytes are then generated from linear interpolation using the first data source and the second data source. In one embodiment, the output bytes are each 8-bits and are stored in a register or other computer-readable storage medium.

A similar parallel vertical interpolation instruction may also be used to further accelerate decompression by performing four parallel linear interpolations between four pairs of 8-bit data bytes describing vertically oriented pixels. In one embodiment, the data comprises a first 8-bit data byte and a second 8-bit data byte identified by arguments received by the parallel vertical interpolation instruction. The parallel vertical interpolation instruction also receives as input an interpolation specifier that identifies an interpolation type, such as linear interpolation using a two-tap filter or another type of interpolation, and the position of a sub-pixel produced by the interpolation relative to a pixel included in the first or second data source, such as the top-most pixel when the first 8-bit data byte and the second 8-bit data byte are appended together vertically. The same interpolation specifier is used for each parallel interpolation and enables an interpolation accuracy of ⅛ of a pixel.

The interpolation specifier may also include a rounding control bit used during the interpolation process to modify the interpolation output. Further, the vertical parallel interpolation instruction may also receive data describing how the data sources are oriented. For example, the parallel horizontal interpolation instruction may receive data indicating that the first data source identifies pixels above the second data source, or vice versa. Four interpolation output bytes are then generated from linear interpolations between four pairs of eight bit data identified by the first 8-bit data byte and the second 8-bit data byte. In one embodiment, the interpolation output bytes each include 8-bits and are stored in a register or other computer-readable storage medium.

Hence, the horizontal parallel interpolation instruction and vertical parallel interpolation instruction accelerate interpolation of frame data by allowing a single instruction to initiate interpolations of a plurality of pairs of pixels within frames in parallel. Initiating parallel interpolations using a single instruction reduces the amount of data retrieved during decompression, which reduces the time used for video decompression. For example, the horizontal and vertical parallel interpolation instructions increase the efficiency of the motion compensator 125 by reducing the number of instructions used to interpolate data from stored frame data.

As shown in FIG. 1, the output of the motion compensator 125 is added to the output of the IDCT module 120 to form frame data. A parallel addition instruction accelerates combination of the motion compensator 125 output and the IDCT module 120 output by allowing a single instruction to perform two parallel additions. In one embodiment, the parallel addition instruction adds a first 9-bit signed number and a first unsigned 8-bit number to provide a first output 8-bit unsigned number and also adds a second 9-bit signed number and a second 8-bit unsigned number to provide a second output 8-bit unsigned number. For example, a first operand includes the first and second 9-bit signed numbers and a second operand includes the first and second 8-bit unsigned numbers. The parallel addition instruction also receives an output operand identifying a location in a computer-readable storage medium where the results of the parallel additions are stored. In one embodiment, a third operand received by the parallel addition instruction includes two 8-bit unsigned numbers that specify the saturation range limits for the result of adding the first 9-bit signed number and the first 8-bit unsigned number and for the result of adding the second 9-bit signed number and the second 8-bit unsigned number.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A video processing system comprising:
a motion compensator coupled to a pixel processing pipeline, wherein the motion compensator is configured to concurrently perform multiple interpolations on multiple pairs of pixels based on a single parallel interpolation instruction, wherein the single parallel interpolation instruction identifies the multiple pairs of pixels, and wherein the single parallel interpolation instruction identifies an interpolation type of each interpolation of the multiple interpolations; and
the pixel processing pipeline configured to receive frame data having a first format, the pixel processing pipeline including:
a color space converter configured to receive the frame data having the first format and generate converted frame data having a second format;
a horizontal upscaler coupled to the color space converter, the horizontal upscaler configured to generate upscaled frame data having the second format by increasing a number of horizontal pixels included in lines of the converted frame data; and
a reduction module coupled to the horizontal upscaler, the reduction module configured to reduce a number of bits used to encode the upscaled frame data to generate reduced frame data.

2. The video processing system of claim 1, wherein the first format comprises a YCbCr format and the second format comprises a RGB format.

3. The video processing system of claim 1, wherein the color space converter comprises:
a plurality of first-in, first-out (FIFO) queues, wherein each FIFO queue of the plurality of FIFO queues is configured to store data associated with a single corresponding color component from the frame data having the first format; and
a computer readable-storage medium including data associated with converting color components of the frame data from the first format to the second format.

4. The video processing system of claim 1, wherein the reduction module is configured to:
identify a plurality of color components comprising one or more pixels of the upscaled frame data; and
reduce the number of bits used to encode the upscaled frame data by reducing a corresponding number of bits encoding a particular color component of the plurality of color components comprising one or more pixels of the upscaled frame data.

5. The video processing system of claim 4, wherein the reduction module reduces the number of bits encoding the particular color component of the plurality of color components by truncating the particular color component of the plurality of color components.

6. The video processing system of claim 1, wherein the reduced frame data is converted to a third format using one or more color component lookup tables, the third format associated with an output device.

7. The video processing system of claim 1, further comprising an inverse discrete cosine transform module coupled to the pixel processing pipeline via a combiner, wherein the motion compensator is coupled to the pixel processing pipeline via the combiner.

8. The video processing system of claim 1, wherein the second format includes a red component encoded by 8 bits, a green component encoded by 8 bits, and a blue component encoded by 8 bits, and wherein the reduced frame data encodes the red component using 5 bits, the green component using 6 bits, and the blue component using 5 bits.

9. The video processing system of claim 7, wherein the combiner is configured to perform parallel addition to combine first output data received from the inverse discrete cosine transform and second output data received from the motion compensator based on a parallel addition instruction, wherein performing the parallel addition comprises:
generating a first 8-bit output number by adding a first 9-bit signed number and a first 8-bit unsigned number, wherein the parallel addition instruction identifies the first 9-bit signed number, the first 8-bit unsigned number, a second 9-bit signed number, and a second 8-bit unsigned number; and generating a second 8-bit output number by adding the second 9-bit signed number and the second 8-bit unsigned number in parallel with generating the first 8-bit output number.

10. The video processing system of claim 9, wherein the parallel addition instruction identifies a first saturation range limit associated with generating the first 8-bit output number and a second saturation range limit associated with generating the second 8-bit output number, wherein the first saturation range limit is identified by a third 8-bit unsigned number, and wherein the second saturation range limit is identified by a fourth 8-bit unsigned number.

11. The video processing system of claim 1, wherein the motion compensator is configured to perform parallel horizontal interpolation based on the single parallel interpolation instruction, wherein the multiple pairs of pixels include four pairings of pixels, and wherein performing the parallel interpolation comprises:

identifying the four pairings of pixels from a first set of four pixels and a second set of four pixels, wherein the single parallel interpolation instruction identifies a first data source identifying the first set of four pixels, a second data source identifying the second set of four pixels, and an interpolation specifier identifying a type of interpolation and a position of a resulting sub-pixel, the position of the resulting sub-pixel relative to a particular pixel of the first set of four pixels or the second set of four pixels; and performing four interpolations in parallel, each interpolation of the four interpolations having a type of interpolation identified by the interpolation specifier and using one of the four pairings of pixels.

12. The video processing system of claim 11, wherein the type of interpolation is linear interpolation, and wherein the single parallel interpolation instruction identifies a first location of the first set of four pixels relative to a second location of the second set of four pixels.

13. The video processing system of claim 1, wherein the motion compensator is configured to perform pixel blending based on a blending instruction, and wherein performing the pixel blending comprises:

generating a first output pixel by interpolating a first pixel and a third pixel using a first interpolation specifier, wherein the blending instruction identifies the first pixel, a second pixel, the third pixel, a fourth pixel, the first interpolation specifier, and a second interpolation specifier; and generating a second output pixel by interpolating the second pixel and the fourth pixel using the second interpolation specifier in parallel with interpolating the first pixel and the third pixel.

14. The video processing system of claim 13, wherein the first interpolation specifier comprises a first alpha value, wherein the second interpolation specifier comprises a second alpha value, and wherein interpolating the first pixel and the third pixel comprises:

generating a first color component of the first output pixel by interpolating a first color component of the first pixel and a first color component of the third pixel using the first interpolation specifier; and generating a second color component of the first output pixel by interpolating a second color component of the first pixel and a second color component of the third pixel using the first interpolation specifier.

15. A method comprising:

combining one or more reference frames and one or more motion vectors at a motion compensator coupled to a pixel processing pipeline, wherein the motion compensator is configured to concurrently perform multiple interpolations on multiple pairs of pixels based on a single parallel interpolation instruction, wherein the single parallel interpolation instruction identifies the multiple pairs of pixels, and wherein the single parallel interpolation instruction identifies an interpolation type of each interpolation of the multiple interpolations;

color space converting, at a color space converter included in the pixel processing pipeline, frame data received at the pixel processing pipeline to generate converted frame data, wherein the frame data has a first format and the converted frame data has a second format;

increasing, at an upscaler coupled to the color space converter, a number of pixels included in lines of the converted frame data to generate upscaled frame data having the second format; and reducing, at a reduction module coupled to the upscaler, a number of bits used to encode the upscaled frame data to generate reduced frame data.

16. An apparatus comprising:

means for combining one or more reference frames and one or more motion vectors, wherein the means for combining concurrently performs multiple interpolations on multiple pairs of pixels based on a single parallel interpolation instruction, wherein the single parallel interpolation instruction identifies the multiple pairs of pixels, and wherein the single parallel interpolation instruction identifies an interpolation type of each interpolation of the multiple interpolations;

means for color space converting frame data from a first format into a second format, the frame data received at a pixel processing pipeline coupled to the means for combining;

means for increasing a number of pixels included in lines of the frame data having the second format, wherein the means for increasing is coupled to the means for color converting; and means for reducing a number of bits used to encode the frame data after increasing the number of pixels, wherein the means for reducing is coupled to the means for increasing.

17. A non-transitory computer readable medium comprising instructions that, when executed by a processor, cause the processor to:

combine one or more reference frames and one or more motion vectors at a motion compensator coupled to a pixel processing pipeline, wherein the motion compensator is configured to concurrently perform multiple interpolations on multiple pairs of pixels based on a single parallel interpolation instruction, wherein the single parallel interpolation instruction identifies the multiple pairs of pixels, and wherein the single parallel interpolation instruction identifies an interpolation type of each interpolation of the multiple interpolations;

color space convert frame data received at the pixel processing pipeline to generate converted frame data, wherein the frame data has a first format and the converted frame data has a second format;

increase a number of pixels included in lines of the converted frame data to generate upscaled frame data; and reduce a number of bits used to encode the upscaled frame data to generate reduced frame data.

18. The video processing system of claim 1, wherein the single parallel interpolation instruction identifies a first data source and a second data source, wherein the first data source and the second data source are associated with the multiple pairs of pixels.

19. The video processing system of claim 7, wherein the inverse discrete cosine transform module comprises a 32-bit micro digital signal processor (DSP), wherein the 32-bit micro DSP comprises a two-stage pipeline, and wherein the 32-bit micro DSP is configured to process four single-instruction, multiple-data (SIMD) instructions per execution cycle.

20. The video processing system of claim 19, wherein the inverse discrete cosine transform module further comprises an instruction memory and a data memory, the data memory including four issue slots for four 16-bit single instruction multiple data (SIMD) instructions.

21. The video processing system of claim 7, wherein the inverse discrete cosine transform module comprises a discrete hardware peripheral coupled to a main processor, and wherein the inverse discrete cosine transform module communicates an interrupt to the main processor upon completion of one or more inverse discrete cosine transform calculations.

22. The video processing system of claim 1, wherein the upscaled frame data comprises multiple portions of data, wherein each portion of data is associated with a corresponding color component, and wherein the reduction module is configured to reduce the number of bits used to encode the upscaled frame data by truncating each portion of data.

23. The video processing system of claim 1, further comprising a combiner coupled to the pixel processing pipeline, wherein the motion compensator is coupled to the pixel processing pipeline via the combiner, and wherein the combiner is configured to concurrently perform multiple addition operations on multiple data inputs based on a single parallel addition instruction.

24. The video processing system of claim 1, wherein the motion compensator is configured to concurrently blend multiple pairs of pixels based on a single blend instruction.

25. The video processing system of claim 3, wherein a first FIFO queue of the plurality of FIFO queues is configured to store data associated with one or more luminance (Y) components, wherein a second FIFO queue of the plurality of FIFO queues is configured to store data associated with one or more blue-difference (Cb) components, and wherein a third FIFO queue of the plurality of FIFO queues is configured to store data associated with one or more red-difference (Cr) components.

* * * * *